Sept. 10, 1968     R. S. BRACE     3,400,788
BALANCED BRAKE SYSTEM
Original Filed Dec. 9, 1965     3 Sheets-Sheet 1
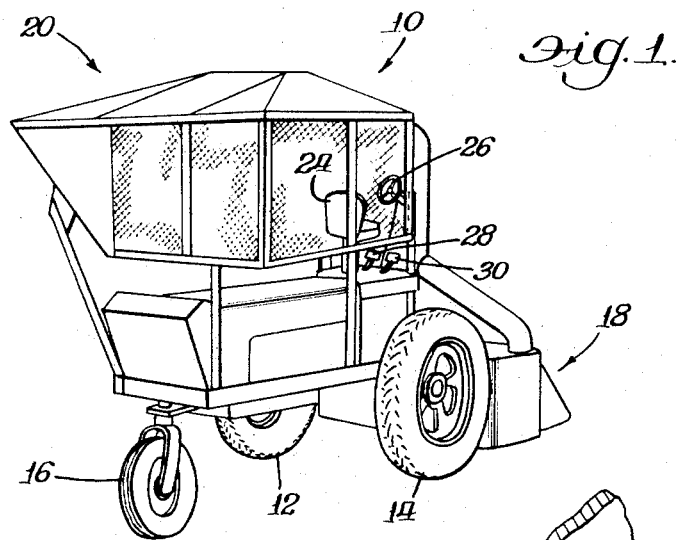
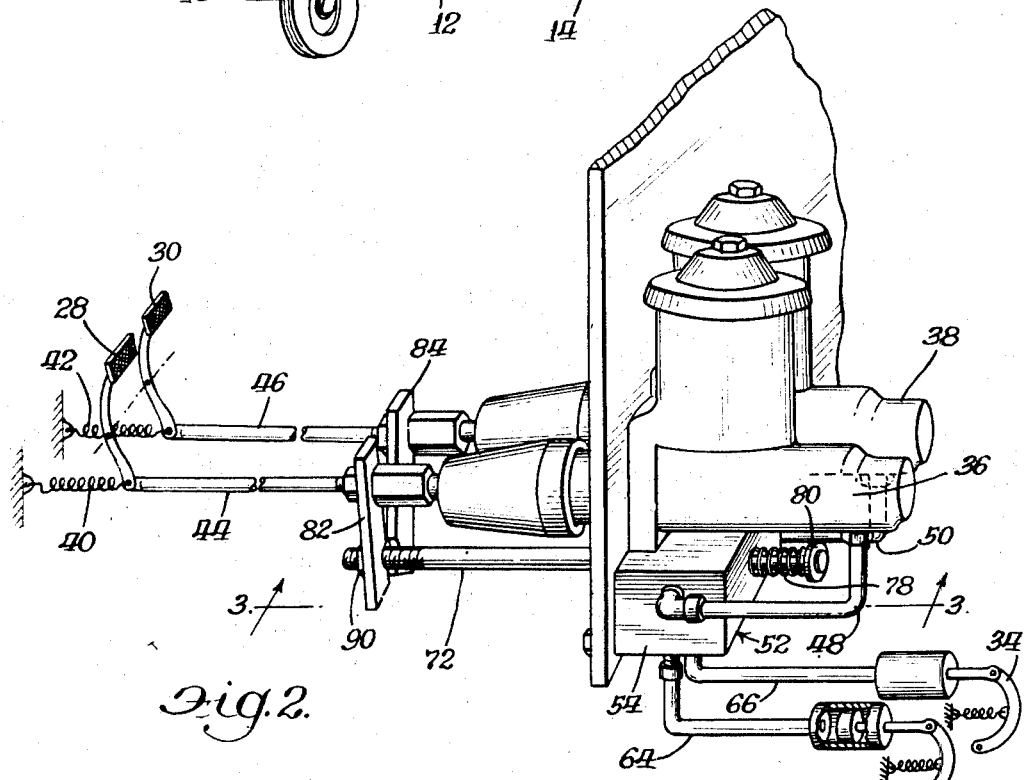

Sept. 10, 1968 R. S. BRACE 3,400,788
BALANCED BRAKE SYSTEM
Original Filed Dec. 9, 1965 3 Sheets-Sheet 2
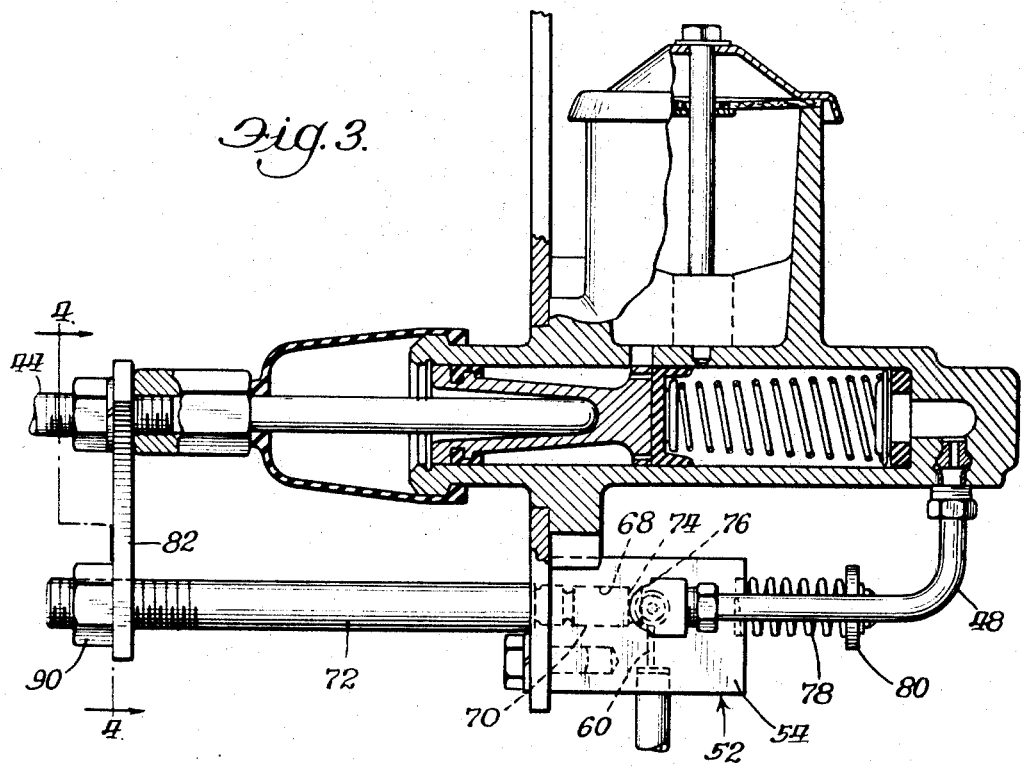
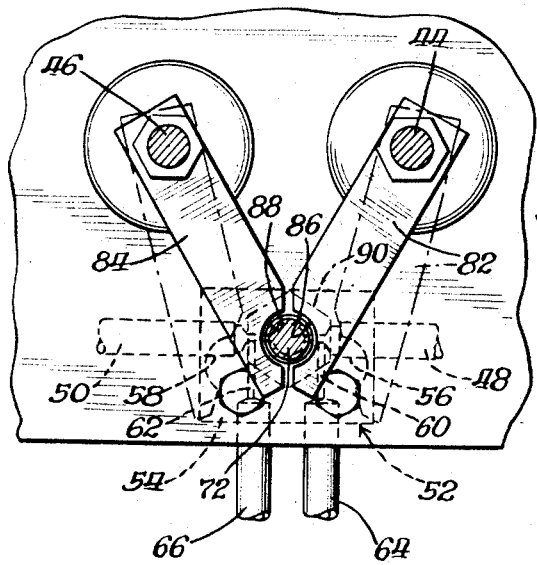
Inventors:
Robert S. Brace
Herbert D. Sullivan
By John J. Kovacik Atty.

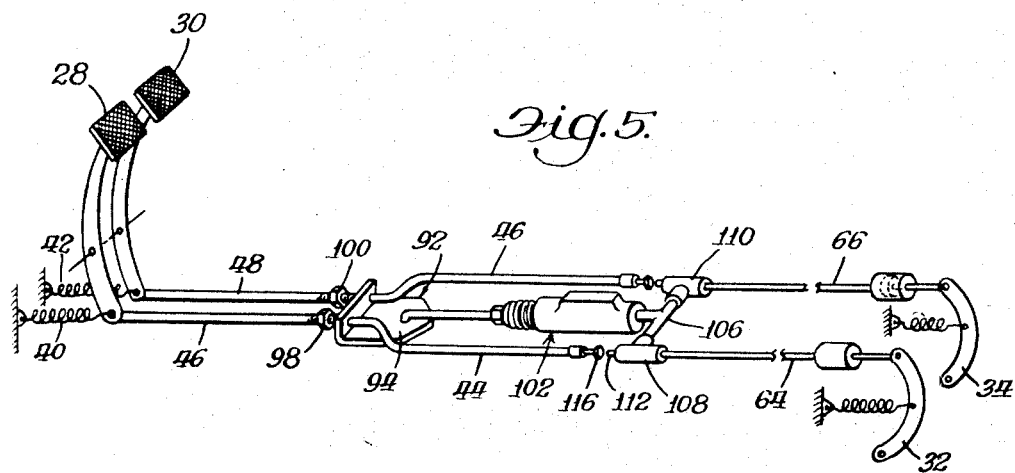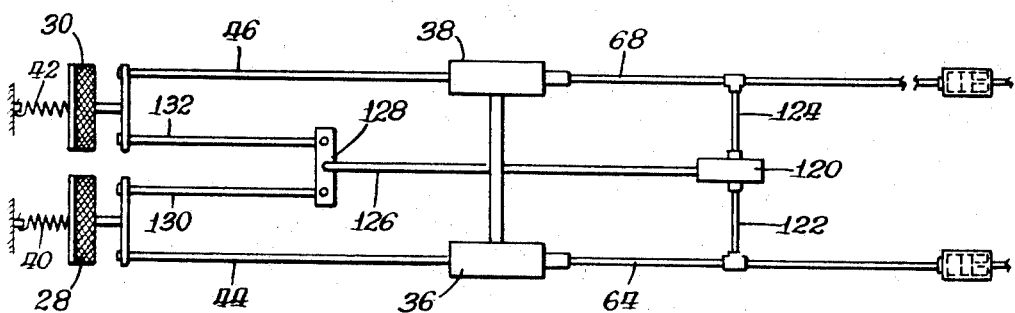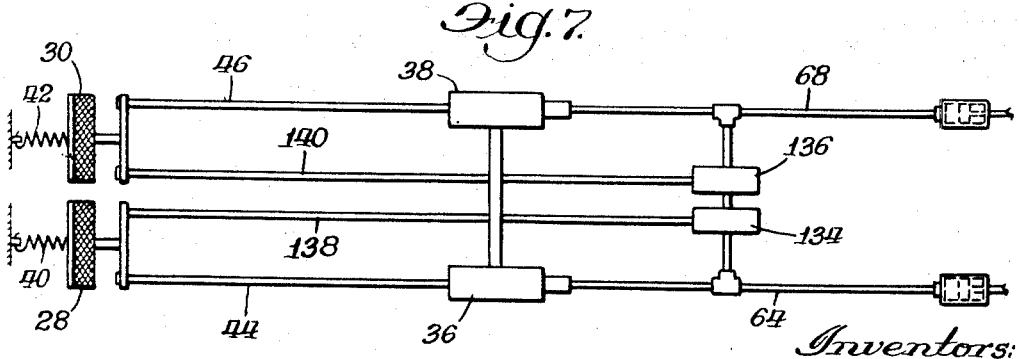

United States Patent Office 3,400,788
Patented Sept. 10, 1968

3,400,788
BALANCED BRAKE SYSTEM
Robert S. Brace, Memphis, Tenn., assignor to International Harvester Company, Chicago, Ill., a corporation of Delaware
Original application Dec. 9, 1965, Ser. No. 512,688, now Patent No. 3,376,078, dated Apr. 2, 1968. Divided and this application Aug. 21, 1967, Ser. No. 661,913
2 Claims. (Cl. 188—152)

ABSTRACT OF THE DISCLOSURE

A balanced brake system having a pair of pedals, master cylinder and valve structures interconnected to provide a common body of fluid between the brakes of both wheels when both pedals are simultaneously actuated and independent bodies of fluid when the pedals are individually operated.

---

The present invention relates to balanced brake system and is a division of our application Ser. No. 512,688 filed Dec. 9, 1965, now Patent No. 3,376,078, for Balanced Brake System.

One application to which the invention is particularly adapted is a cotton picker. A cotton picker, generally speaking, is provided with leading main wheels and a dirigible rear wheel, the main leading wheels being provided with individual brake means which serve both as braking means and steering means. For steering, means are individually actuated and pursuant thereto the braked wheel is slowed down or stopped, and the other proceeds around the braked wheel as a pivot, to produce a steering action. When it is desired to brake the vehicle to slow it down, as distinguished from steering it, the brake means in both the main wheels are actuated.

A broad object of the present invention is to provide novel means for evening or distributing the braking pressure in different branches of a braking system.

A more specific object is to provide such an apparatus incorporating a hydraulic braking system and including novel means for balancing it, which includes interconnecting the hydraulic fluid in the different branches of the system in all cases when both brake means are applied for an intended braking operation.

Another object of the invention is to provide a braking system of the foregoing general character which includes individual pedals manipulatable for applying the individual brake means and operative each independently of the other, and the system is arranged whereby the operator may selectively actuate the brake pedals individually or both in unison, with the result that when either is applied individually, the corresponding branch of the braking system is actuated, to the exclusion of the other, and if both brake pedals are actuated together, both branches of the system are automatically interconnected to produce a completely balanced system for applying a uniform braking pressure to the separate brake means.

Still another object of the invention is to provide a braking system of the foregoing general kind, of such character that it is adaptable to an arrangement selectively utilizing a single master brake cylinder, or individual master brake cylinders for the multiple branches of the system.

Still another object is to provide a braking system of the foregoing general character which is readily adaptable to braking systems already existent and in use on other vehicles, eliminating the necessity for specially designing a vehicle for use of this braking system.

Other objects and advantages of the invention will appear in the following detail description taken in conjunction with the accompanying drawings in which—

FIGURE 1 is a perspective view of a cotton picker, showing only the main components thereof;
FIGURE 2 is a perspective, diagrammatic view, showing the principal components of one form of the braking system embodying the features of the present invention;
FIGURE 3 is a vertical sectional view through the main central portion represented in FIGURE 2;
FIGURE 4 is an end view taken from the left of FIGURE 3;
FIGURE 5 is a perspective, diagrammatic view showing an alternative form of the invention;
FIGURE 6 is a semi-diagrammatic view of another form of the invention; and
FIGURE 7 is a semi-diagrammatic view of an additional form of the invention.

Referring now in detail to the accompanying drawings attention is directed first to FIGURE 1 showing the main components of a cotton picker. The picker indicated in its entirety at 10 includes a pair of main driving wheels 12 and 14 being left and right wheels respectively, and a rear dirigible wheel 16. The picker includes picking units 18 which follow along the rows of cotton and a storage basket 20 into which picked cotton is blown by a suitable blower (not shown). The picker also includes a driver's station 22 including a seat 24 and a steering wheel 26. Also included in the driver's station are a pair of brake pedals 28 and 30, being left and right respectively and correspondingly related with the main driving wheels 12 and 14. To steer the picker, to the left for example, the left brake pedal 28 is actuated which effects application of the brake means in the driving wheel 12 which slows down or stops that wheel and the right driving wheel 14 swings around the wheel 12 as a pivot means and thereby steers the picker to the left. A similar but opposite action takes place when the right brake pedal 30 is applied and the right driving wheel 14 is slowed down or stopped. Usually the dirigible is turned also in the steering actions. When both brake pedals are applied together, both main driving wheels are slowed down, and straight braking action on the picker takes place. However due to imperfections and inaccuracies it is seldom that the theoretical perfect evenness of the application of the two brakes is achieved, and consequently one or the other wheels is braked more than the other and the picker swerves in corresponding direction. Such swerving action is of course undesirable, and dangerous, since in traveling on the highway the picker could swerve into other vehicles.

The apparatus of the present invention is particularly effective for evening the braking effect. In the present instance a hydraulic braking system is utilized, and the invention encompasses an arrangement for interconnecting the hydraulic fluid in the portions of the braking system that are related to the two driving wheel, this interconnection being automatically achieved in response to the two brake pedals being simultaneously actuated.

Attention is now directed to FIGNRES 2, 3, and 4 showing one form of a braking system of the invention, namely a system incorporating two master brake cylinders. Brake shoes 32 and 34 are associated respectively with the main driving wheels 12 and 14. Two master brake cylinders 36 and 38 are associated with the left and right other components mentioned namely, the brake pedals, brake means and driving wheels. The brake pedals are normally retained in retracted position by tension springs 40. The brake pedals are operatively connected with brake rods 42 for operating respective ones of the master cylinders 36 and 38. Upon actuation of the master cylinders, the fluid is transmitted through the conduits 48 and 50 leading to valve means 52 including a valve block 54 having passages 56 and 58 communicating with the conduits 48 and 50. Leading from the passages 56 and 58 are vertical passages 60 and 62 communicating with conduits 64 and 66 operatively connected with the brake means 32 and 34 respectively.

The valve block 54 has a passage 68 therein forming a cross communication between the passages 56 and 58. Slidable in the passage 68 is a valving portion 70 of a plunger 72 having a circumferential groove 74 therein. When the plunger is in retracted position, shown in FIGURE 3, an end portion 76 of the plunger is in register with the cross passages 56 and 58 and it cuts off communication between those passages, the groove 74 being retracted from communication therewith. When the plunger is in advanced position, or to the right of that shown in FIGURE 3, the groove 74 is in communication with those cross passages and establishes a passage therebetween for relatively free flow of the brake fluid.

The plunger 72 is biased to advanced position (to the right, FIGURE 3) by a compression spring 78 working between the valving block 54 and a stop 80 on the end of the plunger 72. The plunger 72 is normally held in retracted position by one or both of a pair of arms 82 and 84 fixed on respective ones of the rods 44 and 46. These arms 82 and 84 extend downwardly and toward each other and at their lower ends are provided with notches 86 and 88 together receiving the plunger 72. A stop means in the form of a nut 90 is secured to the end of the plunger. The tension springs 40 and 42 are of substantial strength, and operative for normally retaining the brake pedals 28 and 30 in retracted position, against the biasing effect of the compression spring 78.

If the operator depresses one of the brake pedals, for example, 28, the master cylinder 36 is actuated, forcing the hydraulic fluid through the corresponding conduits and passages to apply the brake means 32. In such a step the arm 82 on the rod 44 is moved rearwardly, but the other rod 46 is retained in retracted position which, acting through the arm 84 retains the plunger 72 in retracted position, or to the left as viewed in FIGURE 3. Consequently the passages 56 and 58 in the valve block are cut off from communication with each other and only the brake means 32 is applied. Through this action the steering effect is accomplished, namely the left driving wheel 12 is slowed down or stopped and the picker turns toward the left. The same action takes place, but in the opposite direction, when the right brake pedal 30 is applied, in the latter case the arm 82 retaining the plunger 72 in advanced position. In this case again, the passages 56 and 58 in valve block are cut off from communication with each other and the braking effect is applied only to the brake means 34 and the right driving wheel 14.

When however the operator wishes to produce a braking action, as distinguished from a steering action, in which both driving wheels are to be braked, he actuates both brake pedals 28 and 30 simultaneously. As a consequence both brake rods 44 and 46 are actuated which moves the arms 82 and 84, releasing the holding effect thereof on the plunger 72, and as a consequence the latter is moved to advanced position by the compression spring 78. In the latter position of the plunger 72, the groove 74 is in communication with the cross passages 56 ad 58 so that the hydraulic fluid in the complete braking system, i.e., in the lines 64 and 66 to the two separate brake means, are evened forming a continuous line in which the braking pressure applied is distributed throughout the complete line. Thus if one or the other of the brake pedals 30 should be actuated at a slightly different time than the other, or with greater force than the other, the force on both of the pedals is exerted accurately and evenly throughout the hydraulic fluid and the two brake means are applied with even force. It may be convenient to releasably interconnect the brake pedals to assure simultaneous actuation thereof, as in driving on a highway, in a known manner.

Attention is now directed to FIGURE 5 showing a modified form of the invention which utilizes a single master brake cylinder for the two branches of the system. In the present instance the two brake pedals 28 and 30 are connected with the brake operating rods 44 and 46 respectively as described above. Associated with these rods is a plunger plate 92 conveniently in the form of an angle having a horizontal portion 94 and an upturned flange 96. The flange 96 has apertures receiving the rods 44 and 46 and the latter are provided with adjustable nuts 98 and 100 which engage the flange 96 for moving the plunger plate as described below.

The single master brake cylinder is shown at 102 which may be of conventional form. A brake operating plunger 104 is provided and connected with the horizontal portion 94 of the plunger plate 92. The master cylinder 102 is provided with a T-shape outlet conduit having branches communicating with valves 108 and 110 respectively. Leading from the latter are the conduits 64 and 66 identified above and communicating with the brake means 32 and 34.

The valve means 108 and 110 are internally biased to closed position. The valves have exterior plungers 112 and 114 which when the valves are in closed position are moved to the left as viewed in FIGURE 5. The rear portions of the brake operating rods 44 and 46 are in alignment with the plungers 112 and 114 and operatively engaged the latter in steering and braking operations as explained below. Preferably the brake operating rods are provided with adjustable extensions such as set screws 116 and 118 for adjustably setting the points at which the rods engage the plungers of the valves.

In the operation of the system illustrated in FIGURE 5, and assuming that the operator wishes to steer the picker rather than brake it, he actuates one of the brake pedals, e.g., the left one 28, moving the corresponding rod 44 rearwardly. In the first increment of movement of this rod, the nut 98 thereon moves into engagement with the flange 96 without however moving the plunger plate 92. Also in this first increment of movement the rear end of the rod 44 engages the plunger 112 and opens the valve 108. Further movement of the pedal and rod 44, by virtue of the engagement of the nut 98 with the flange 96, moves the plunger plate 92 rearwardly which in turn actuates the master cylinder plunger 104, operating the cylinder in a known manner, forcing the hydraulic fluid through the conduit 106, and valve 108 and then through the wheel line 64 to the brake means. Meanwhile it will be understood that the valve 110 remains closed. Similarly when it is desired to steer the picker to the right, the operator actuates the brake pedal 30 with similar but opposite action in the system, resulting in the brake 34 being applied without the brake 32 being applied.

When it is desired to brake the vehicle, as to slow it down or stop it, the operator depresses both brake pedals, moving both rods 44 and 46 rearwardly and opening both of the valves 108 and 110. Then upon further depression of the brake pedals, and consequent movement of the plunger plate 92, the master cylinder is actuated and the hydraulic fluid is forced through both wheel lines 64 and 66 to both of the brake means.

The hydraulic fluid throughout both branches of the system is equalized, through the branch conduit 106, from the single master cylinder so that all the braking force is distributed throughout all of the hydraulic fluid in both branches of the system with the result that both brakes are applied evenly.

FIGURE 6 shows in semi-diagrammatic form, another form of the invention. In the present instance the two master cylinders 36 and 38 are operated by brake rods 44 and 46 connected with the brake pedals 28 and 30. Leading from the master cylinders are the brake lines 64 and 68 between which, on the outlet side of the cylinder, is a normally closed valve 120. The valve is actuated by a plunger 126 pivotally connected midway on an evener bar 128 the ends of which are pivotally connected with rods 130 and 132 connected with the respective brake pedals 28 and 30. Upon movement of the plunger 126 to the rear, a sufficient amount, the valve 120 is opened. However upon actuation of either of the brake pedals alone, the evener bar or lever 128 moves to an inclined position, and the plunger 126 moves a distance less than that moved by the rod 130, or substantially one-half that amount. This movement of the plunger 126 is not sufficient to open the valve 120, but upon actuation of both brakes 28 and 30 together the evener bar 128 remains in directly transverse position and is moved bodily the distance equal to the movement of etiher end alone when a single brake is applied. The corresponding greater movement of the plunger 126 is sufficient to open the valve 120 and thus upon application of both brakes the valve 120 is opened and the lines 64 and 68 communicate with each other to form a continuous fluid system for the brakes.

FIGURE 7 shows an arrangement similar to that of FIGURE 6, but utilizes two valves rather than one. In the present instance two normally closed valves 134 and 136 arranged in series, are interposed between the brake lines 64 and 68. Associated with the valves are respective plungers 138 and 140 actuated by the respective brake pedals. Upon actuation of either brake pedal alone, the corresponding valve is opened bu the other remains closed and the corresponding master cylinder is actuated for applying the corresponding brake. On the other hand when both brake pedals are applied both the valves are opened, establishing communication between the fluid lines 64 and 68.

The invention also encompasses an arrangement in which the valve means is normally open. The arms 82 and 84 may be manually set out to their dot-dash line positions (FIGURE 4), releasing the plunger 72, and enabling the valve to be held open by the spring 78. With the various parts so positioned, the picker can be driven on the highway with complete assurance that the brakes will be applied evenly, even after complete inattention from one picking season to the next. When the operator begins picking, he merely retracts the plunger 72 and returns the arms 82 and 84 to their full line position.

I claim:

1. An hydraulic braking system for a vehicle having a pair of wheels, brake means for each wheel, and brake pedals associated with respective brake means, comprising, a single master cylinder, a pair of branch lines leading from the master cylinder to respective ones of the brake means, a valve in each branch line, brake rods connected with the brake pedals and associated with respective ones of the valves, and operative for opening the valves in response to actuation of the respective brake pedals, and means interconnecting the brake pedals and master cylinder operative for actuating the master cylinder in response to actuation of either of the brake pedals and wherein a single master cylinder actuator is provided, and the brake rods have individual elements engageable with the actuator pursuant to actuation of the brake pedals and each being thereby operative, pursuant to actuation thereof, for actuating the master cylinder and wherein the master cylinder includes an actuating plunger extending generally parallel with the brake rods, the master cylinder actuator includes a plate connected with the plunger and a flange extending generally transverse to the direction of movement of the brake rods and having apertures receiving the brake rods, and the brake rods are provided with projections engageable with the flange pursuant to actuation of the brake pedals and consequent movement of the brake rods and thereby operative for moving the actuator and actuating the master cylinder, said brake rods operative to open the respective valves and thereafter effect engagement of the projections with said flange to move said plunger.

2. A braking system for a vehicle having transversely spaced wheels, brake means for each wheel, and in the use of which braking of one of the wheels produces a steering action and braking of both of the wheels produces a stopping action, and brake pedals associated with respective brake means, comprising, means operable upon actuation of either of the brake pedals for transmitting braking power from the pedal to the respective brake means, and means operable in response to simultaneous actuation of both the pedals for equalizing the power from the pedals to both the brake means wherein the brake system is of hydraulic nature and includes branches leading to the respective wheels, and includes a pair of master cylinders operatively associated with respective ones of the brake pedals and brake means, said branches are constantly open between the master cylinders and the brake means, cross line means interconnecting said branch lines, a pair of normally closed valve means in the cross line means on the outlet side of the master cylinders, and direct mechanical means secured to each valve and a respective pedal operative only upon actuation of both brake pedals for opening both of the valve means.

References Cited

UNITED STATES PATENTS

| 2,241,214 | 5/1941 | Milster. |
| 2,741,337 | 4/1956 | Ziskal _____ 188—152 |
| 3,064,434 | 11/1962 | Parrett _____ 60—54.6 |
| 3,120,244 | 2/1964 | Hahn _____ 60—54.5 |
| 3,345,112 | 10/1967 | Kershner _____ 60—54.5 |

FOREIGN PATENTS 717,669    10/1931    France.

MILTON BUCHLER, *Primary Examiner.*

GEORGE E. A. HALVOSA, *Assistant Examiner.*